US008808842B2

(12) United States Patent
Avazzeri et al.

(10) Patent No.: US 8,808,842 B2
(45) Date of Patent: Aug. 19, 2014

(54) OFFSET-PRINTABLE COATED WHITE PAPER HAVING A HIGH FLUORESCENT INTENSITY AND METHOD FOR PRODUCING SAME

(75) Inventors: Laurence Avazzeri, Saint Martin au Laert (FR); Michel Goguelin, Besse sur Braye (FR)

(73) Assignee: Arjo Wiggins Fine Papers Limited, Manchester (GB)

( * ) Notice: Subject to any disclaimer, the term of this patent is extended or adjusted under 35 U.S.C. 154(b) by 1055 days.

(21) Appl. No.: 12/525,111

(22) PCT Filed: Jan. 31, 2008

(86) PCT No.: PCT/FR2008/050156

§ 371 (c)(1),
(2), (4) Date: Oct. 26, 2009

(87) PCT Pub. No.: WO2008/107617

PCT Pub. Date: Sep. 12, 2008

(65) Prior Publication Data

US 2010/0035075 A1 Feb. 11, 2010

(30) Foreign Application Priority Data

Jan. 31, 2007 (FR) ...................................... 07 00676

(51) Int. Cl.

| | |
|---|---|
| ***B32B 27/10*** | (2006.01) |
| ***D21H 21/30*** | (2006.01) |
| ***B41M 5/52*** | (2006.01) |
| ***D21H 19/66*** | (2006.01) |
| ***D21H 19/44*** | (2006.01) |
| ***D21H 23/48*** | (2006.01) |
| ***B41M 5/50*** | (2006.01) |

(52) U.S. Cl.

CPC ........... *D21H 19/44* (2013.01); *B41M 2205/38* (2013.01); *D21H 21/30* (2013.01); *B41M 5/52* (2013.01); *D21H 19/66* (2013.01); *B41M 5/5254* (2013.01); *B41M 5/5218* (2013.01); *B41M 5/5227* (2013.01); *D21H 23/48* (2013.01); *B41M 5/506* (2013.01)

USPC ........ 428/207; 428/195.1; 428/206; 428/208; 428/219; 428/512; 428/513; 428/514; 427/420

(58) Field of Classification Search

USPC .............. 428/195.1, 206, 207, 208, 219, 512, 428/513, 514; 427/420

See application file for complete search history.

(56) References Cited

U.S. PATENT DOCUMENTS

| | | | | |
|---|---|---|---|---|
| 4,423,118 | A | 12/1983 | Corbett et al. | |
| 6,736,936 | B1 | 5/2004 | Weston et al. | |
| 7,731,820 | B2 * | 6/2010 | Cockcroft et al. | 162/162 |
| 2003/0177941 | A1 * | 9/2003 | Barbera-Guillem | 106/31.15 |
| 2003/0178165 | A1 * | 9/2003 | Bobsein et al. | 162/135 |
| 2004/0020615 | A1 | 2/2004 | Linhart et al. | |
| 2006/0251819 | A1 | 11/2006 | Zama et al. | |
| 2008/0107912 | A1 | 5/2008 | Barcock | |

FOREIGN PATENT DOCUMENTS

| | | | |
|---|---|---|---|
| DE | 10055592 | A1 | 5/2002 |
| DE | 10144131 | A1 | 3/2003 |
| EP | 1416088 | A2 | 5/2004 |
| EP | 1577438 | A1 | 9/2005 |
| WO | 01/07714 | A1 | 2/2001 |
| WO | 2006/035234 | A2 | 4/2006 |
| WO | WO 2006045714 | A1 * | 5/2006 |

OTHER PUBLICATIONS http://www.lookchem.com/cas-164/16470-24-9.html Retrieved: Nov. 1, 2012.*
http://www.lookchem.com/300w/2010/0619/16470-24-9.jpg Retrieved Nov. 1, 2012.*
International Search Report of PCT/FR2008/050156, Mailing Date of Aug. 29, 2008.

* cited by examiner

*Primary Examiner* — Mark Ruthkosky
*Assistant Examiner* — Christopher Polley
(74) *Attorney, Agent, or Firm* — Westerman, Hattori, Daniels & Adrian, LLP

(57) ABSTRACT

The invention concerns a coated white sheet having a fluorescence intensity of more than 55, measured in accordance with international standard ISO 11475: 2004, by the difference between the value for the CIE whiteness under D65 illuminant and the value for this same CIE whiteness after interposing a filter that eliminates wavelengths shorter than 420 nm, and being offset-printable with no mottling, said coated sheet comprising at least one base sheet and a printable white surface coat having a pigmented composition which comprises: —at least some white coating pigments and at least one coating binder; —at least one fluorescent whitening agent in a total quantity of 1% dry weight or more with respect to the dry weight of said pigments; —at least one support substance for said whitening agent in a total quantity of dry weight of more than 2% with respect to the dry weight of said pigments. The invention also concerns a method for producing said coated sheet by curtain coating said pigmented composition.

19 Claims, No Drawings

OFFSET-PRINTABLE COATED WHITE PAPER HAVING A HIGH FLUORESCENT INTENSITY AND METHOD FOR PRODUCING SAME

The present invention relates to an offset-printable coated white sheet at least the surface coat of which possesses high fluorescence intensity by dint of its composition. It also relates to a process for its production.

In the field of paper and that of plastic sheets treated by application of a pigmented coat to obtain offset-printability, for a long time fluorescent whitening agents, also known as optical brighteners, have been used which act by absorbing natural light in the ultraviolet and in the near-visible below 420 nm then re-emitting the light by fluorescence at about 440 nm, i.e. in the blue or blue-violet region of the visible spectrum. They thus augment the whiteness of these coated sheets by greatly displacing their shades from yellow towards blue.

The use of such fluorescent whitening agents—unsaturated organic molecules containing two to six sulphone groups—has been widely described, in particular as regards the necessity for such molecules to be well fixed in the sheet in their trans isomeric form, which is the only active form.

The best performing existing starting substance by far for ensuring such binding is cellulose because of interactions between the electrons of the hydroxyl groups and the unsaturated structure of the fluorescent whitening agent. In fact, it is easy to obtain uncoated papers which are visually very white by adding a sufficient quantity of an appropriate fluorescent whitening agent; said papers have a high fluorescence intensity of at least 55 or even of the order of 60 to 70 as measured using international standard ISO 11475: 2004.

In the field of offset-printability, it is known that for a good print, in particular for an ink-surface interaction which is as homogeneous as possible and a shorter ink drying time, it is necessary to apply a coat composed of at least one mineral or organic pigment and at least one natural or synthetic binder to the surface of the base sheet. Depending on the composition and the application process, the weight of that coat after drying is at least 5 g/m$^2$ dry weight per face in order to perceive an improvement in printability, preferably 10 g/m$^2$ per face, and if a high level of offset-printability is required, much more, possibly applied in several steps.

The problem with such coats is that the fluorescent whitening agents are poorly fixed by the components of the coats and it is difficult to increase the fluorescence without causing a counter-whitening effect known as "greening" which corresponds to a change in the shade of the coated sheet from blue towards green. This change can be quantified by the variation $\Delta a^*$ in the trichromatic coordinate $a^*$ of the CIELAB space measured under the conditions of standard ISO 11475: 2004.

Another problem is that the coats, as a function of their weight per square meter, act to a greater or lesser extent as a UV filter for incident light with respect to the fluorescent whitening agent present in the base sheet.

In order to overcome these two problems, a number of solutions which are described below have been proposed in the prior art and are used alone or in combination.

A first solution, when a sheet of stationery is used, is to provide the fibrous base with a high fluorescence intensity which is then attenuated to a greater or lesser extent depending on the composition and thickness of the coat which is deposited on top. In practice, this pathway uses a large quantity of fluorescent whitening agent and limits the coat deposit to about 8 g/m$^2$ dry weight per face if a high fluorescence intensity is to be retained.

Another solution is to introduce into the coat composition chemical substances which act as a support for the fluorescent whitening agent, i.e. which act to fix the agent in a manner analogous to that of cellulose. Support substances which may be cited include starch, polyvinyl alcohol (PVA), carboxymethylcellulose (CMC), polyvinylpyrrolidone (PVP), polyethylene glycol (PEG), etc; they are macromolecules which are rich in hydrophilic groups. In practice, the quantity of whitening agent is limited; with respect to the total dry weight of the pigments, it is usually 0.2% to less than 1% dry weight of fluorescent whitening agent and 0.3% to 2% dry weight of support substance. Indeed, if the quantity of fluorescent whitening agent is to be increased, highly critical greening is observed beyond a value for $\Delta a^*$ of 1. The shade may be corrected by adding colorants, but this reduces the luminosity, and thus the perception of whiteness. If the quantity of support substance is to be increased beyond 2% in order to push back this greening limit, another problem linked to the quality of the offset print (in particular with air-drying inks) is observed which is due to a non-uniform ink-surface interaction, which produces an irregular, shadowed appearance in the print, termed "mottling".

The aim of the present invention is to overcome the disadvantages of the prior art and the above alternatives to obtain coated sheets which appear very white and which are offset-printable, in particular by air-drying offset inks without any substantial mottling defect.

The applicant remedies this by providing sheets of stationery and also plastic sheets, said sheets being coated and having a high fluorescence intensity due to the incorporation of fluorescent whitening agents and support substances in relatively high quantities compared with those used in the prior art. The skilled person would not have been inclined to use such quantities, for the reasons discussed above.

Thus, the invention provides a coated white sheet having a fluorescence intensity of more than 55, measured in accordance with international standard ISO 11475: 2004, by the difference between the value for the CIE whiteness under D65 illuminant and the value for this same CIE whiteness after interposing a filter that eliminates wavelengths shorter than 420 nm, and being offset-printable with no mottling, said coated sheet comprising at least one base sheet and a printable white surface coat having a pigmented composition which comprises:

- at least some white coating pigments and at least one coating binder;
- at least one fluorescent whitening agent in a total quantity of 1% dry weight or more with respect to the dry weight of said pigments;
- at least one support substance for said whitening agent in a total quantity of dry weight of more than 2% with respect to the dry weight of said pigments.

The fact that the coated sheet of the invention is "offset-printable without mottling" means that during offset-printing, in particular using air-drying inks, it has no substantial surface mottling. This mottling may be evaluated, in particular, using the test described in the examples below, which provides a mottling index.

Said coated sheet of the invention has a high fluorescence intensity and thus appears to be very white; further, its surface is offset-printable, in particular using air-drying inks, without substantial mottling.

More particularly, the Applicant has demonstrated that said surface coat must have as regular a thickness as possible, even if it is highly uneven below the surface of the base sheet and/or the sub-coats. This regularity of the coat deposit allows to obtain a homogeneous surface coat composition after drying and prevents mottling during printing. In fact, it has been shown that during drying of the coat that has been deposited in an aqueous medium, the support substance, which is in fact hydrosoluble, migrates in an irregular manner with the water as a function of the irregularities of the coat deposit, these irregularities being notably linked to structural irregularities of the base onto which it is applied and/or to some irregular penetration of the coat, which then during offset-printing (in particular with air-drying inks) causes a non-uniform ink-surface interaction which makes the print appear irregular, which may explain the mottling observed in the prior art when the support substances are used in a larger quantity.

In one particular case of the invention, said coated sheet may comprise at least one sub-coat comprising pigments and at least one binder, disposed below said surface coat.

More particularly, in accordance with the invention, the weight of said surface coat is at least 5 $g/m^2$ dry weight per face, preferably at least 10 $g/m^2$, more particularly comprised between 15 and 30 $g/m^2$.

More particularly, in accordance with the invention, only this coat deposited nearest the surface comprises a large quantity of fluorescent whitening agent and support substance, the base sheet and/or the sub-coats possibly intrinsically having a low, or even zero fluorescence intensity in order to reduce the cost of these fluorescent whitening agents and support substances, which are expensive.

In fact, despite the low fluorescence intensity of the base and/or any possible sub-coats, the Applicant has unexpectedly established that the sheets of the invention have a high fluorescence intensity, and that they do not exhibit substantial mottling on offset-printing.

Preferably, the total quantity of fluorescent whitening agent in said surface coat is more than 1% and less than or equal to 4% dry weight with respect to the total dry weight of said coating pigments, in particular comprised between 1.5% and 3%.

Preferably, the total quantity of support substance in said surface coat is 10% or less dry weight with respect to the total dry weight of said coating pigments, in particular comprised between 4% and 8%.

In accordance with a particular case of the invention, the total quantity of fluorescent whitening agent in said surface coat is equal to 1% dry weight with respect to the total dry weight of said coating pigments, and the total quantity of support substance in said surface coat is more than 5% dry weight with respect to the total dry weight of said coating pigments.

Preferably, said coated sheet of the invention has a fluorescence intensity of more than 60, said intensity being measured using international standard ISO 11475: 2004 as described above.

In accordance with a particular case of the invention, said base sheet, if appropriate coated with one or more sub-coats, has a fluorescence intensity comprised between 0 and 20.

In accordance with a particular case of the invention, the coating pigments of said coat are selected from calcium carbonates, kaolins, talcs, titanium dioxide and plastic pigments. As an example, the plastic pigments are hollow microspheres of a copolymer (styrene-acrylic) with a mean size comprised between 1 μm and 0.1 μm.

More particularly, the surface coat comprises at least one coating binder selected from acrylic polymers, styrene-butadiene polymers and possibly other monomers which are routinely used in coating, as well as other additives in common use such as shading colorants. The coating binders are used in the form of a stabilized aqueous dispersion (latex).

In accordance with the invention, the fluorescent whitening agent is more particularly selected, alone or as a mixture, from various derivatives of stilbene disulphonic acid with a total of 2, 4 or 6 sulphonic groups, in particular those which are commercially available. They may possibly be commercial preparations already containing a very small quantity of a support substance.

In accordance with the invention, the support substance is selected, alone or as a mixture, from polyvinyl alcohol (PVA), carboxymethylcellulose (CMC), polyvinylpyrrolidone (PVP) and polymers based on N-vinylformamide. The PVAs are preferably selected from those with a high degree of hydrolysis, in particular more than 98%.

The base sheet may be any fibrous sheet, in particular a sheet based on cellulose and/or synthetic fibres, such as a paper including board.

The base sheet may also be a sheet or a plastic film, for example a paper termed synthetic paper based on an extruded film of polyolefin from POLYART® or a sheet based on extruded polypropylene produced and sold by PRIPLAK®.

The base sheet may also be a complex of a fibrous sheet, in particular a paper and a film or plastic sheet or a paper coated with a coat of extruded plastic.

The invention also concerns a process for producing said coated sheet.

The Applicant has also discovered that among the various means for depositing a pigmented composition in an aqueous medium onto a substrate, a contour coating process such as a curtain coating process contributes to achieving the aims of the invention, in particular in the case of a substrate with a surface which is not very regular. Indeed, this process allows to obtain a surface coat which has been deposited with a very regular thickness thereby avoiding non-homogeneous migration of the hydrosoluble support substance during drying, and avoiding mottling during offset-printing.

Thus, the invention also concerns a process for producing said offset-printable and white coated sheet with the characteristics described above in accordance with the invention, comprising a step for forming said surface coat by depositing the pigmented composition defining it, and carried out in an aqueous medium, by curtain coating onto said base sheet, this latter being coated with sub-coat(s) if appropriate.

More particularly, said coating process is applicable to a fibrous base sheet, in particular a paper. Curtain coating may be carried out on-machine during the fabrication of paper, or it may be carried out off-machine.

In a particular case of the invention, the process is such that the pigmented composition of said surface coat is deposited simultaneously with that of a pigmented sub-coat described above using a multilayer curtain coating head.

However, in accordance with a particular case of the fabrication process, the said sub-coat or sub-coats may be applied using a sizing press, for example on the paper machine on which the paper base is produced or off-machine for a plastic based sheet. The sizing press may be of the conventional type or it may be a modified model, for example the "Speedsizer" marketed by Voith. Other coating processes may be used as long as they are appropriate for applying the desired weight of coats; several sub-coats may be applied using different processes. A first sub-coat may be coated using a sizing press and a second pigmented sub-coat may be applied by blade coating, for example.

More particularly, the total dry weight of the set of coats of a sheet of the invention is more than 10 $g/m^2$ dry weight per face, preferably 15 $g/m^2$, or even 30 $g/m^2$ per face or more.

The coated sheet of the invention may comprise said surface coat on each of its faces.

The invention will be better understood with the aid of the following non-limiting or comparative examples and tests.

Tests

The fluorescence intensity is measured according to ISO 11475: 2004 by the difference between the values of the CIE whiteness under D65 illuminant and the value of this dimension measured after interposing a filter eliminating wavelengths below 420 nm.

By way of indication, we may mention measurements of the diffuse reflectance factor in the blue R457 in accordance with standards ISO 2469: 1994 and ISO 2470: 1999 under D65 illuminant as well as the whitening intensity at 457 nm by difference with the value for the diffuse reflectance R457 after interposing a filter eliminating wavelengths below 420 nm.

The greening $\Delta a^*$ is calculated by the difference between the value for the trichromatic coordinate $a^*$ in the presence of a filter at 420 nm for the coated sheet without fluorescent brightening agent and that under the same measurement conditions for the coated sheet with a given percentage of fluorescent whitening agent.

The homogeneity of the print produced by offset-printing on a 4-colour ROLAND 200 machine with air-drying inks NOVAFIT 918 SUPREME BIO from FLINT GROUP GERMANY GmbH is evaluated by the mottling index, which is determined by image analysis using a KHEOPS machine sold by TECHPAP, the index being on a scale of 1 (perfect) to 9 (very poor) with a score of 7 or above being considered to be unacceptable for this use.

EXAMPLE 1

Example 1, along with Table 1, comprises comparative Examples 1a to 1c and Example 1d, in accordance with the invention.

A fibrous base (paper) which has previously been surfaced and pre-coated, the total coat weight being 30 g/m$^2$ dry weight per face, with pigmented compositions of calcium carbonate, starch binders and copolymer binders (styrene-butadiene) and having a fluorescence intensity of 39, is coated again in an amount of 17 g/m$^2$ dry weight per face with a pigmented surface composition produced in an aqueous medium and essentially comprising:

- a mixture of calcium carbonate (95 parts) and talc (5 parts) pigments;
- a copolymer binder (styrene-butadiene) in an amount of 7% dry weight with respect to the dry pigment weight;
- a fluorescent whitening agent A, which is a disulphone stilbene derivative sold by 3Vsigma under the denomination OPTIBLANC NL, in a quantity as a dry weight with respect to the total weight of pigments as shown in Table 1;
- a support substance for the whitening agent, which is a low viscosity 4-98 type polyvinyl alcohol with a high degree of hydrolysis in a quantity as a dry weight with respect to the total weight of pigments as indicated in Table 1.

The surface compositions of comparative tests 1a to 1c are coated using the trailing blade (steel) process and the aqueous compositions are adjusted at identical dry matter contents (66%) and identical viscosities.

The pigmented surface composition of test 1d of the invention is deposited by curtain coating.

Thus, matt coated papers are obtained with a total coat weight of 47 g/m$^2$ dry weight per face, as used for high quality offset sheet printing (sheet to sheet printing with air-drying inks) applications.

The coated papers of tests 1a to 1d are tested in offset-printing on the 4 colour Roland machine and their mottling index is evaluated as described above.

Comparative test 1a illustrates a standard coated paper for offset-printing, both for its coat formulation and for its coating process: it is established that the print quality is good, but the fluorescence intensity is insufficient.

Comparative tests 1b shows the negative effect of increasing the percentage of fluorescent whitening agent which then results in greening, which is the opposite effect to that desired.

Comparative test 1c shows that under the standard coating conditions it is not possible to increase the percentage of support substance without degrading the printability (mottling) in an unacceptable manner.

Test 1d illustrates the invention; a coated sheet which appears very white is obtained because of the high fluorescence intensity and for which good offset print quality is observed with no notable mottling.

TABLE 1

| | Test | | | |
|---|---|---|---|---|
| | 1a comparative | 1b comparative | 1c comparative | 1d |
| % support substance | 1 | 1 | 6 | 6 |
| % fluorescent whitening agent A | 0.4 | 1.5 | 0.4 | 1.5 |
| Coating type | Blade | Blade | Blade | Curtain |
| Fluorescence intensity of coated sheet | 47 | 41 | 52 | 62 |
| Mottling | 4 | 3.5 | 8 | 3 |

It should be noted that the coated paper 1d of the invention has a CIE whiteness of 136, a diffuse reflectance factor in the blue R457 of 107% and a whitening intensity of 22%.

EXAMPLE 2

Example 2, along with Table 2, comprises comparative Examples 2a and 2b and Examples 2c and 2d with surface compositions in accordance with those defined for the invention.

Two aqueous pigmented compositions are prepared for matt coating, which are constituted by the same mixture of calcium carbonate pigments and a copolymer binder (styrene butadiene) in an amount of 11% dry weight with respect to the dry weight of the pigments.

One of the surface compositions, not in accordance with the invention, further comprises standard percentages according to the prior art (0.4%) of the support substance of Example 1 and a fluorescent whitening agent B which is a tetrasulphonated stilbene derivative sold by CLARIANT under the denomination LEUCOPHOR LCPE.

The other composition comprises the same products but in quantities which are in accordance with the invention.

These two compositions are each coated in an amount of 15 g/m$^2$ dry weight per face onto two fibrous bases (paper) of 120 g/m$^2$ with a low (16) or high (69) fluorescence intensity.

Table 2 shows that, in contrast to the surface compositions of the invention (tests 2c and 2d), it is not possible with a standard coating composition of the prior art (tests 2a and 2b) to reconcile a coat deposit which is compatible with the printability requirement, i.e., a coat comprising a small quantity of support substance to avoid mottling, with a high fluorescence of the coated sheet (more than 55) even if a paper with a very high fluorescence intensity (test 2b) is used as the base.

TABLE 2

| Test | 2a | 2b | 2c | 2d |
|---|---|---|---|---|
| Fluorescence intensity of fibrous base | 16 | 69 | 16 | 69 |
| % support substance | 0.4 | | 6 | |
| % fluorescent whitening agent B | 0.7 | | 1.3 | |
| Fluorescence intensity of coated sheet | 45 | 51 | 59 | 63 |

EXAMPLE 3

Example 3, along with Table 3, comprises comparative examples 3a and 3b with surface compositions in accordance with those defined for the invention.

These examples illustrate that even starting from a base with a near-zero fluorescence intensity, the pigmented compositions of the invention allow to obtain coated sheets with a very high fluorescence intensity.

Table 3 records the results obtained by coating a fibrous base with the same pigmented composition as in Example 2, this time in the presence of 6% (dry weight with respect to dry pigments) of the support substance and 2.5% (dry weight with respect to dry pigments) of fluorescent whitening agent B.

TABLE 3

| Test | 3a | 3b |
|---|---|---|
| Fluorescence intensity of fibrous base | 2 | |
| Weight of coat (g/m$^2$ dry weight per face) | 15 | 30 |
| Fluorescence intensity of coated sheet | 62 | 69 |

Coated papers 3a and 3b of the invention have respective whitening intensity of 22% and 25%.

EXAMPLE 4

Example 4 comprises comparative examples 4a to 4d and Examples 4e to 4q with surface compositions in accordance with those defined for the invention.

These examples show that in contrast to the usual conditions, the surface compositions in accordance with those defined in the invention do not have critical greening.

A fibrous base (paper) which has previously been surfaced and pre-coated, with a total coated weight of 15 g/m$^2$ dry weight per face, with pigmented compositions of calcium carbonate and a mixture of starch binders and copolymer binders (styrene-butadiene), said pre-coated base having a fluorescence intensity of 43, is coated in an amount of 12 g/m$^2$ dry weight per face with a pigmented surface composition produced in an aqueous medium essentially comprising:

- calcium carbonate pigments;
- a copolymer binder (styrene-butadiene) in an amount of 8% dry weight with respect to the dry pigment weight;
- a fluorescent whitening agent in a quantity as a dry weight with respect to the total weight of pigments as shown in Table 4;
- a support substance in a dry weight quantity with respect to the total weight of pigments as indicated in Table 4.

The support substance used is the one mentioned in the preceding example; the fluorescent whitening agent can be agent A (disulphonated stilbene derivative) or B (teirasulphonated stilbene derivative) already mentioned in the preceding examples, or another agent C which is a hexasulphonated stilbene derivative sold by ROBAMA under the denomination RESISTOL SLK (see Table 4).

Demi-matt coated paper sheets are obtained.

Compared with comparative tests 4a to 4d, only tests 4e to 4q with surface pigmented compositions in accordance with the invention have both a high fluorescence intensity and a greening Δa* of less than 1.

Depending on the mode of design of the coated sheet, one will select, on an industrial scale, the best quality/cost compromise which allows to achieve the desired fluorescence intensity with a greening Δa* of less than 1, preferably less than 0.6.

TABLE 4

| Test | 4a | 4b | 4c | 4d | 4e | 4f | 4g | 4h | 4i | 4j | 4k | 4l | 4m | 4n | 4o | 4p | 4q |
|---|---|---|---|---|---|---|---|---|---|---|---|---|---|---|---|---|---|
| % support substance | | 0.8 | | | 3 | | | | | 6 | | | | | | 9 | |
| % fluorescent whitening agent A | 0.4 | 1.5 | 2.5 | 4 | 1.5 | 1 | 1.5 | 2.5 | 4 | | | | | | 1.5 | 2.5 | 4 |
| % fluorescent whitening agent B | | | | | | | | | | 1 | 1.5 | 2.5 | 4 | | | | |
| % fluorescent whitening agent C | | | | | | | | | | | | | | 1.5 | | | |
| Fluorescence intensity of coated sheet | 47 | 40 | 36 | 31 | 59 | 63 | 64 | 63 | 59 | 58 | 63 | 66 | 68 | 65 | 66 | 67 | 63 |
| Δa* of test | 0.24 | 0.70 | 1.21 | 1.72 | 0.59 | 0.38 | 0.52 | 0.64 | 0.94 | 0.26 | 0.34 | 0.39 | 0.47 | 0.24 | 0.42 | 0.57 | 0.79 |

EXAMPLE 5

This Example 5, along with Table 5, comprises Examples 5a to 5c which illustrate the use of mixtures of support substances for the production of pigmented compositions in accordance with those of the invention.

The coating conditions of Example 4 are repeated, with 2% (dry weight with respect to dry weight of pigments) of fluorescent whitening agent A (disulphonated stilbene derivative), 0.8% (dry weight with respect to dry weight of pigments) of PVA support substance as described in the preceding examples and 5% (dry weight with respect to dry weight of pigments) of one of the following support substances:

S1=CMC sold by HERCULES under the denomination BLANOSE 7L1C1;

S2=N-vinylformamide based polymer sold by BASF under the denomination LUPAMIN 4500;

S3=PVP sold by BASF under the denomination LUMITEN PPR 8450.

TABLE 5

| Test | 5a | 5b | 5c |
|---|---|---|---|
| Support substance | S1 | S2 | S3 |
| Fluorescence intensity of coated sheet | 59 | 60 | 62 |
| CIE whiteness of coated sheet | 141 | 142 | 144 |

It should be noted that the coated papers 5a, 5b and 5c of the invention respectively have a measure of reflectance factor R457 of 104% (for 5a), 104.5% (for 5b) and 105% (for 5c), and a respective whitening intensity of 21% (for 5a), 21% (for 5b) and 22% (for 5c).

EXAMPLE 6

This Example 6, along with Table 6, illustrates the invention using a plastic sheet as the base sheet.

The coating composition of test 4o (9% of PVA support substance as a dry weight with respect to dry pigments and 1.5% dry weight with respect to dry pigments of fluorescent whitening agent A (disulphonated stilbene derivative)) is applied at a coating weight of 23 g/m$^2$ dry weight per face deposited on a plastic sheet (based on extruded polyolefin film coated with a pigmented pre-coat) of 150 g/m$^2$ sold by ARJOBEX Ltd under the trade name POLYART® with a fluorescence intensity of 8.

Table 6 shows that a sheet with a high fluorescence intensity is obtained.

TABLE 6

| Test | 6 |
|---|---|
| Fluorescence intensity of coated sheet | 68 |
| Δa* for test | 0.6 |

The invention claimed is:

1. A coated white sheet comprising at least one base sheet and a printable and white surface coat, wherein the coat has a weight of from 10 to 30 g/m$^2$ dry weight per face, wherein the coat has a pigmented composition which comprises:

white coating pigments and at least one coating binder;

at least one fluorescence whitening agent in a total quantity of more than 1% dry weight with respect to the dry weight of said coating pigments;

at least one support substance for said whitening agent in a total quantity of dry weight of more than 2% with respect to the dry weight of said coating pigments, and wherein the coat has a regular thickness, so that the coated white sheet has a fluorescence intensity of more than 55, measured in accordance with international standard ISO 11475: 2004, by the difference between the value for the CIE whiteness under D65 illuminant and the value for this same CIE whiteness after interposing a filter that eliminates wavelengths shorter than 420 nm, and the coated white sheet is offset-printable with no mottling.

2. A coated sheet according to claim 1, which comprises at least one sub-coat comprising pigments and at least one binder, disposed below said surface coat.

3. A coated sheet according to claim 1, wherein the total quantity of dry weight of said fluorescent whitening agent in said surface coat is greater than 1% and lower than 4% dry weight with respect to the dry weight of said coating pigments.

4. A coated sheet according to claim 1, wherein the total quantity of dry weight of said support substance in said surface coat is greater than 2% and lower than 10% dry weight with respect to the dry weight of said coating pigments.

5. A coated sheet according to claim 1, wherein the coating pigments of said surface coat are selected from the group consisting of calcium carbonates, kaolins, talcs, and titanium dioxide.

6. A coated sheet according to claim 1, wherein said fluorescent whitening agent of said surface coat is selected from the group consisting of stilbene derivatives containing a total of 2, 4 or 6 sulphonic groups, and mixtures thereof.

7. A coated sheet according to claim 1, wherein said support substance is selected from the group consisting of polyvinyl alcohols, carboxymethylcellulose, polyvinylpyrrolidone, polymers based on N-vinylformamide, and mixtures thereof.

8. A coated sheet according to claim 7, wherein the polyvinyl alcohols have a degree of hydrolysis higher than 98%.

9. A coated sheet according to claim 1, wherein said surface coat comprises a coating binder selected from the group consisting of acrylic polymers, styrene-butadiene polymers, and mixtures thereof.

10. A coated sheet according to claim 1, wherein said fluorescence intensity of said coated sheet is more than 60.

11. A coated sheet according to claim 1, wherein said base sheet has a fluorescence intensity comprised between 0 and 20.

12. A coated sheet according to claim 1, wherein said base sheet is a one of a fibrous sheet, a film, a plastic sheet, a composite of a film and a fibrous sheet, or a composite of a plastic sheet and a fibrous sheet.

13. The coated white sheet according to claim 1, wherein the total quantity of dry weight of the support substance is at least 6% with respect to the dry weight of said coating pigments.

14. The coated white sheet according to claim 1, wherein the surface coat has a weight of from 12 to 30 g/m$^2$ dry weight per face and the total quantity of dry weight of the support substance is at least 3% with respect to the dry weight of said coating pigments.

15. The coated white sheet according to claim 1, wherein the surface coat has a weight of from 12 to 30 g/m$^2$ dry weight per face and the total quantity of dry weight of the support substance is at least 6% with respect to the dry weight of said coating pigments.

16. A process so as to obtain a coated sheet according to claim 1, wherein said surface coat is formed by depositing its said pigmented composition in an aqueous medium by curtain coating onto said base sheet, if appropriate coated with sub-coats.

17. A process according to claim 16, wherein the pigmented composition of said surface coat is deposited by curtain coating simultaneously with a pigmented sub-coat.

18. A process according to claim 16, wherein the base sheet is a paper.

19. A process according to claim 17, wherein the base sheet is a paper.

* * * * *